June 4, 1963
J. H. REESE ETAL
3,091,914
BALANCE WHEEL FOR AN ELECTRIC WATCH
Filed Nov. 1, 1961
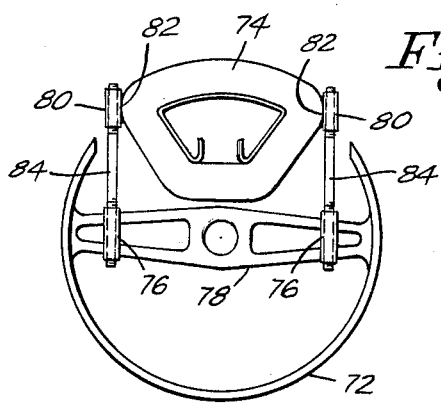
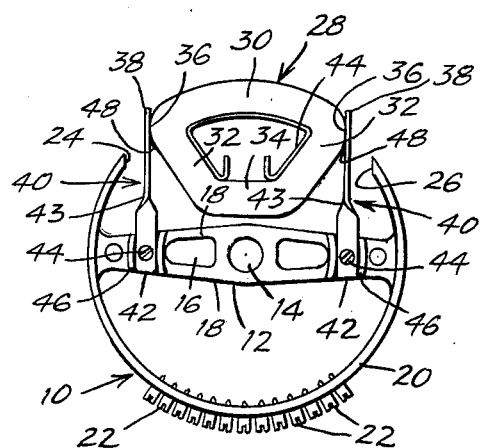
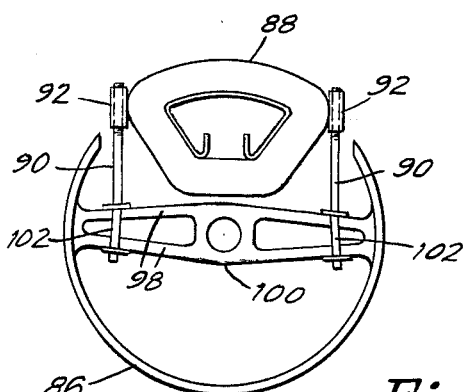
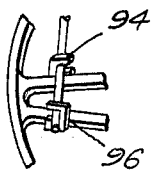
INVENTORS
James H. Reese &
Peter J. Serlemitsos,
BY Diggins + LeBlanc
ATTORNEYS

United States Patent Office 3,091,914
Patented June 4, 1963

3,091,914
BALANCE WHEEL FOR AN ELECTRIC WATCH
James H. Reese, Manheim, Pa., and Peter J. Serlemitsos, College Park, Md., assignors to Hamilton Watch Company, Lancaster, Pa., a corporation of Pennsylvania
Filed Nov. 1, 1961, Ser. No. 149,270
15 Claims. (Cl. 58—28)

This invention relates to battery-operated electric watches having a balance wheel carrying a coil and more particularly relates to an improved balance wheel and coil assembly.

In the type of battery-operated electric watch disclosed in assignee's copending application Serial No. 409,934, filed February 12, 1954, now Patent No. 2,888,797, and applications Serial Nos. 578,843 and 578,844, filed April 17, 1956, now Patents Nos. 2,972,745 and 2,954,664, the train of the watch is driven by means of an impulse motor utilizing stationary permanent magnets and a coil mounted on the balance wheel. The coil is a multiturned coil of sector or pie shape having an open center portion and may be formed in the manner explained in detail in assignee's copending application Serial No. 648,379, filed March 25, 1957.

In the watch shown in assignee's aforementioned copending application Serial No. 578,844, the coil is mounted on the balance wheel by means of a pair of brackets which are cemented to the coil and then attached to the balance wheel by screws. These brackets must be accurately located on the coil and care must be exercised in the cementing operation since a failure of the cement joint in either bracket will allow one end of the coil to drop, thereby stopping the watch. Because of the small size of the balance wheel utilized in wrist watches, the brackets are quite tiny, so that extreme care is necessary in assembling the coil and bracket arrangements.

Locating and holding the small brackets during cementing is difficult and permits no compensation for variation in coil size or slight variations in coil radii which lead to poor fit between the coil and the rigid bracket. The assembly of the coil and the brackets requires two separate handling operations to assure proper cement bonding. When the brackets are finally attached to the balance wheel by means of screws, any slight misalignment between the brackets and the wheel rim causes the coil to be tilted and/or causes strain on the balance wheel throwing it out of true. In retruing such wheels excessive spoilage results from broken electrical circuits and attachments. In addition to the foregoing, rigid brackets do not permit the coil to move under shock until the bracket is broken loose from the coil. The screws holding the coil to the wheel also occassionally works loose and permit the coil to move so as to change the balance wheel moment of inertia and destroy watch time-keeping characteristics.

According to the present invention it has now been found that the foregoing difficulties may be overcome through the use of a particular arrangement of larger brackets of a simple shape which are more easily handled and which are self-aligning. By means of this new arrangement the transfer of shock from the coil to the balance wheel or from the balance wheel to the coil is largely eliminated to render the balance wheel-coil assembly relatively shock-proof after it is once assembled. In addition to this, the brackets are such that variations in coil size and radii present no particular problem and the entire mounting operation permits of easy truing of the balance wheel.

According to certain embodiments of the invention the coil is mounted on the balance wheel in an adjustable manner which permits changing the position of the coil with respect to the balance wheel arrangement thereby further facilitating ease of truing of the balance wheel.

It is accordingly a primary object of the present invention to provide in a battery-operated electric watch having a balance wheel carried coil, an improved balance wheel coil assembly.

It is another object of the present invention to provide in a battery-operated electric watch having a balance wheel carried coil, an improved balance wheel-coil assembly which permits of easier more economic mounting of the coil on the balance wheel.

It is another object of the present invention to provide in a battery-operated electric watch having a balance wheel carried coil, a method of mounting the coil on the balance wheel which largely prevents the transfer of shock from the balance wheel to the coil and vice versa.

It is another object of the invention to provide in a battery-operated electric watch having a balance wheel carried coil, a coil mounting assembly which permits of easy truing of the balance wheel.

It is another object of the invention to provide in a battery-operated electric watch a balance wheel-coil assemblage wherein the coil is adjustably mounted on the balance wheel.

These and further objects and advantages of the invention will become more apparent upon reference to the following specification and claims and appended drawings wherein:

FIGURE 1 is a plan view of a balance wheel having a coil mounted thereon according to one embodiment of the present invention;

FIGURE 2 is a plan view of a balance wheel having a coil mounted thereon according to another embodiment of the invention;

FIGURE 3 is a plan view of a balance wheel having a coil mounted thereon according to another embodiment of the invention; and FIGURE 4 is a perspective view showing the method of clamping the support brackets to the balance wheel of FIGURE 4.

Referring to FIGURE 1 there is seen a balance wheel 10 having a cross-bar 12 mounted on a balance staff 14. The cross-bar 12 is skeletonized at 16, so that each radial portion thereof consists of a pair of legs 18. A rim 20 is carried by the cross-bar and supports a series of poising weights 22 in a conventional manner.

The rim 20 is cut away at 24 and 26 to provide space for mounting a pie or sector shaped coil 28. The coil 28 consists of an arcuate outer side 30, a pair of substantially radial sides 32, and an inner side 34. It will be seen that the junctures of the radial sides 32 and the arcuate side 30 form curvate coil portions 36.

Attached to each curvate coil section 36 is one end 38 of a beryllium-copper bracket 40 which has its other end 42 twisted 90° thereto at 43 and attached to the cross-bar 12 by means of screws 44 which screw threadedly enter the cross-bar. Raised ridges 46 are provided on either side of the secured ends of the brackets in order to aid in positioning and assembling. Alternatively to the screw threaded connection of the brackets 40 to the cross arm 12 it is possible to use a spot welded connection which permits even more rapid assembly. The ends 38 of brackets 40 are attached to the curvate portions 36 of the coil 28 by globs of cement which flow out and form fillets 48 which result in a strong bond.

With brackets of the type shown in FIGURE 1, it is possible to adjust the position of the coil by bending either the ends 38 or the ends 42 of the brackets so as to provide a two-plane positioning. This same construction provides highly advantageous yieldability and protection from shock in two planes.

Referring to FIGURE 2 there is shown another embodiment of the invention wherein a balance wheel 72 carries a coil 74. According to this embodiment of the invention a pair of threaded cylinders 76 are secured to the cross bars 78 of the balance wheel by any suitable means, such as brazing or welding. A similar pair of cylinders 80 are cemented to the curvate portion 82 of the coil 84. Small flexible rods or wires 84 screw threadedly enter both pairs of cylinders 76 and 82 so as to provide an adjustable mounting for the coil 74. This type of mounting provides all the adjustability and yieldability of the type shown in FIGURE 1 with the added advantage of being able to further position the coil by adjusting the rods or wires 84 in the cylinders 76.

Referring to FIGURES 3 and 4 there is shown still another embodiment of the invention wherein a watch balance wheel 86 has a coil 88 mounted therein by means of a pair of resilient rods or wires 90 similar to those used in the embodiment of the invention shown in FIGURE 2. The outer ends of the rods or wires 90 are secured to the curvate portions of the coil 88 by means of cylinders 92 as in the preceding embodiment. The opposite ends of the rods or wires, however, are received in a pair of opposing clamps 94 and 96 mounted on the legs 98 of the cross bar 100. The direction in which the clamps 94 and 96 face is such as to provide for a stressing of the resilient rods or wires 90 so that the ends 102 thereof are stressed outwardly as is clearly seen in the figure of the drawing. This mounting eliminates the necessity for welding or screw insertion while providing all of the adjustability available with the preceding embodiments of the invention.

While all of the embodiments of the invention illustrated in the drawing have shown balance wheels with broken rims, it is also comprehended that the coil may be provided of such a size that the rim of the balance wheel is unbroken and the coil is mounted within the periphery of the rim.

It will be apparent from the foregoing that with the coil mounting of the present invention, the coil is rendered relatively unaffected by shocks imparted to the balance wheel and vice versa. The method of assembly eliminates labor and material while at the same time providing for an easy and economical truing of the balance wheel.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

This application is a continuation-in-part of assignee's application Serial No. 785,531, filed January 7, 1959, now abandoned.

What is claimed and desired to be secured by United States Letters Patent is:

1. An electric watch having a balance wheel mounted on a balance staff, and a coil yieldably mounted on said balance wheel by resilient support means attached to said balance wheel and coil to permit resilient yielding movement of said coil in a plane perpendicular to the axis of said balance staff.

2. An electric watch having a balance wheel mounted on a balance staff, and a coil yieldably mounted on said balance wheel by resilient support means attached to said balance wheel and coil to permit resilient yielding movement of said coil in at least two planes at right angles to one another.

3. An electric watch having a balance wheel mounted on a balance staff, and a coil yieldably mounted on said balance wheel by resilient support means attached to said balance wheel and coil to permit resilient yielding movement of said coil in a plurality of planes.

4. An electric watch having a balance wheel mounted on a balance staff, and a coil yieldably mounted on said balance wheel by resilient support means attached to said balance wheel and coil to permit resilient yielding movement of said coil in a plurality of planes in excess of two.

5. An electric watch as set out in claim 3 wherein said resilient support means comprise a pair of brackets formed of strips of metal twisted intermediate the ends thereof so that one end of each strip lies in a plane substantially perpendicular to the plane of the other end of the same strip.

6. An electric watch as set out in claim 5 wherein said balance wheel has a rim supported on a cross arm and said brackets have one end thereof attached to said cross arm and the other end thereof attached to said coil.

7. An electric watch as set out in claim 6 wherein said coil has opposed curvate portions and said other ends of said brackets are attached to said curvate portions.

8. An electric watch as set out in claim 7 wherein said other ends of said brackets are attached to said coil by cement.

9. An electric watch as set out in claim 3 wherein said resilient support means comprise a pair of rod shaped resilient brackets yieldable in any direction.

10. An electric watch as set out in claim 9 wherein said balance wheel has a rim supported on a cross arm and said brackets have one end thereof attached to said cross arm and the other end thereof attached to said coil.

11. An electric watch as set out in claim 10 wherein said coil has opposed curvate portions and said other ends of said brackets are attached to said curvate portions.

12. An electric watch as set out in claim 10 wherein said other ends of said brackets are screw threaded, and a pair of screw threaded members attached to said coil, said screw threaded ends of said brackets being screw-threadedly engaged in said members.

13. An electric watch as set out in claim 12 wherein said one ends of said brackets are screw threaded, and a pair of screw threaded members attached to said cross arm, said screw threaded ends of said brackets being screw-threadedly engaged in said members attached to said cross arm.

14. An electric watch as set out in claim 10 including attaching hooks on said cross arm for receiving said one ends of said brackets, said hooks being disposed to stress said brackets when said coil is mounted between the other ends thereof.

15. An electric watch having a balance wheel mounted on a balance staff and a coil mounted on said balance wheel by adjustable support means attached to said balance wheel and coil to permit independent adjustment of the positions of two spaced portions of said coil relative to said balance staff, said adjustable support mean comprising a pair of brackets supported by said balance wheel at one end and attached to said coil at the other end, said brackets being adjustable to vary the distance between the points of attachment of said coil to said brackets and the points of attachment of said brackets to said balance wheel.

References Cited in the file of this patent

UNITED STATES PATENTS 2,952,117    Reese et al. _____ Sept. 13, 1960